United States Patent [19]
Koritsky et al.

[11] 3,869,628
[45] Mar. 4, 1975

[54] ELECTRIC MACHINE STATOR

[76] Inventors: Andrei Vladimirovich Koritsky, Lefortovsky val, 7/6, kv. 1; Viktor Alexandrovich Ignatov, Novorossiiskaya ulitsa, 12, kv. 19; Leonid Moiseevich Polyak, ulitsa Podbelskogo, 28, korpus 2, kv. 8, all of Moscow; Semen Abramovich Shapiro, Pervomaiskaya ulitsa 6, kv. 19, Istra Moskovskoi oblasti; Grigory Aronovich Bokman, ulitsa Dybenko, 32, korpus 3, kv. 267, Moscow; Vladimir Alexandrovich Mordvinov, ulitsa Vlasova, 7, korpus 2, kv. 43, Moscow; Mikhail Ivanovich Zhizhin, B-Demidovsky pereulok, 4, kv. 2, Moscow; Alexandr Davydovich Slonimsky, ulitsa 9 Gvardeiskoi divizii, 60 kv. 23; Kimik Tigranovich Sevinian, Pervomaiskaya ulitsa, 12, kv. 6, both of Istra Moskovskoi oblasti; Semen Izrailovich Adaskin, Petrozavodskaya ulitsa, 30, kv. 89; Vladimir Vladimirovich German, Stavropolskaya ulitsa, 32, kv. 12, both of Moscow, all of U.S.S.R.

[22] Filed: Dec. 6, 1973

[21] Appl. No.: 422,205

[52] U.S. Cl................... 310/179, 310/216, 310/259
[51] Int. Cl. ............................................. H02k 1/12
[58] Field of Search............ 310/179, 268, DIG. 6, 310/254–259, 216–218; 336/120

[56] References Cited
UNITED STATES PATENTS

| | | | |
|---|---|---|---|
| 2,885,645 | 5/1959 | Wennerberg | 336/120 |
| 3,275,863 | 9/1966 | Fodor | 310/179 X |
| 3,725,708 | 4/1973 | Possis | 310/179 |

*Primary Examiner*—Donovan F. Duggan
*Attorney, Agent, or Firm*—Fleit & Jacobson

[57] ABSTRACT

An electric machine stator, wherein a printed circuit multilayer winding is arranged on a ferromagnetic carrier and a stator active zone is composed of a set of uniform stacks, each comprising a toothed section and printed circuit conductors mechanically coupled thereto.

8 Claims, 8 Drawing Figures

ELECTRIC MACHINE STATOR

The present invention relates to electric machines and, more particularly, to an electric machine stator with printed circuit windings preferably multilayer windings.

Stators of this kind used in electric machines currently employed in automatic regulation and control systems, various drives as well as domestic appliances, are known.

Conventional electric machines with printed circuit windings employ a magnetic core, pressure-shaped into a toroid and made of a ferromagnetic material.

A portion of the magnetic core is provided with slots, made, for example, by an electroerosion technique, which receive printed circuit winding conductors flush with the surface of the magnetic core.

Known in the art is a stator for axial air gap electric machines, which comprises a plurality of spaced magnetic lamination sections arranged about a central axis. Each of the sections has a central grain-oriented lamination stack which is interposed between end-face stacks made from a material without magnetic orientation. Fitted in the spacings between the sections are preformed coils making up a distributed winding. All the sections and the winding are assembled into a compact unit by means of a plastic binder.

In another known stator of an a-c machine the stator active zone is formed of a number of stacks, each consisting of a plurality of winding conductors and ferromagnetic sheet elements arranged in interleaved relation and spaced from one another by an insulating layer. The stacks are fastened in the stator yoke with the help of fixing claws and compounded after having been assembled.

The prior art stators of a-c machines are difficult in manufacture and complicate the automation thereof; they do not display the required design flexibility, causing thereby complication in creating a series of standard machines with different characteristics.

Furthermore, in the known stators of electric machines, interlayer insulation is liable to be damaged during the manufacture and assembly of the stator active zone, thus impairing their operational reliability.

It is an object of the present invention to obviate the above disadvantages.

The present invention is in essense aimed at providing an electric machine stator with printed circuit windings, preferably multilayer windings, which is simple in manufacture and reliable in operation.

This object can be accomplished by the provision of a multilayer winding arrangement in the stator active zone (stator core), having reliable interlayer insulation. It is essential that the stator manufacturing process should be easily automated.

The arrangement should also exhibit adequate design flexibility.

In accordance with the invention, the above object is achieved by the provision of an electric machine stator core composed of a set of uniform stacks, each comprising a portion of a toothed section and printed circuit conductors mechanically coupled to said section.

In each stack, said portion of the toothed section is advantageously made in the form of an individual tooth from a ferromagnetic material, with printed circuit conductors being arranged on the side walls thereof.

From the mass-production standpoint, each stack should preferably be made in the form of a solid disk comprising a portion of a toothed section along its height and printed circuit conductors mechanically coupled to said section.

Suprisingly favourable results have been registered on testing an electric machine having a stator composed of separate stacks, each comprising a portion of a toothed section and printed circuit conductors mechanically coupled to said section.

Such an arrangement of the stator active zone provides for intensive and uniform cooling of all the layers of the winding, thus allowing the current density in the printed circuit conductors to be substantially increased without affecting the requirements imposed on the machine's operational reliability.

The use of the present invention will make it possible to considerably expand the field of application of electric machines with printed circuit windings. Each of the stacks making a stator active zone can be designed for a certain function and taken together they enable any desired feature to be imparted to the electric machine, for example, a predetermined magnetic density distribution in the machine air-gap.

The proposed stator design based on standardized stator stacks permits the construction of a series of standard machines with different characteristics, automation of the process of their manufacture and, consequently, a substantial increase in the efficiency of an electric machine with printed circuit windings.

Besides, the present invention provides for an increase in the operational reliability of electric machines with multilayer printed circuit windings, as the proposed design practically eliminates any possible interlayer short-circuiting.

The invention will be more fully understood from the following description of a preferred embodiment thereof with reference to the accompanying drawings in which.

Figure 1:
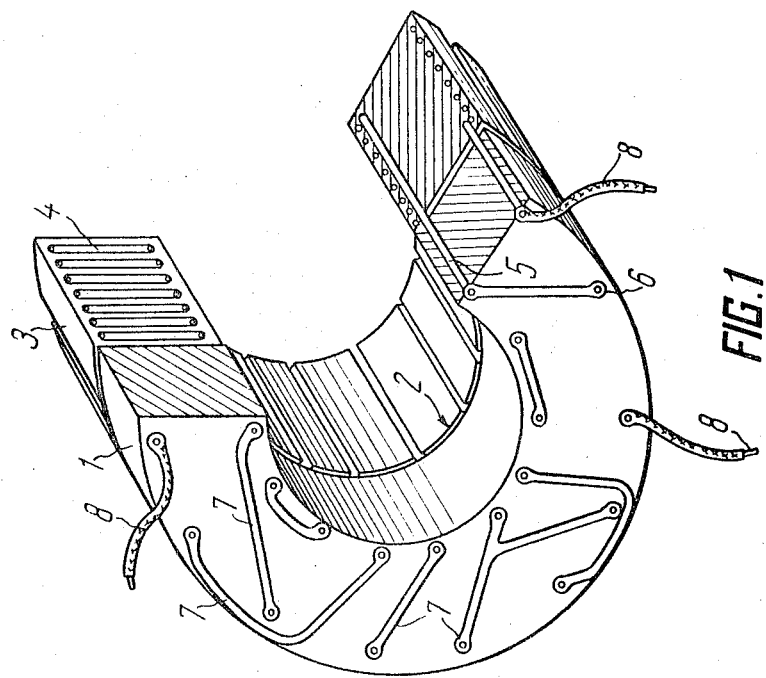
FIG. 1 is a diagrammatic view of an end-face type stator whose active zone is composed of uniform stacks in the form of segments.

An end-face type electric machine stator with printed circuit multilayer windings (FIG. 1) comprises a ferromagnetic carrier I in the form of a toroid having fastened thereto by any known mechanical means, for example, an adhesive compound 2, stacks 3 forming a stator active zone. The stacks 3 are secured at a distance from one another, thus providing for the insulation of printed circuit conductors 4. Terminal pins 5 of the stacks 3 are soldered in metallized passages 6 of the ferromagnetic carrier and interconnected on a ferromagnetic carrier outer face by printed circuit conductors. Leads 8 are soldered in their respective metallized passages 6 of the ferromagnetic carrier.

Figure 2:
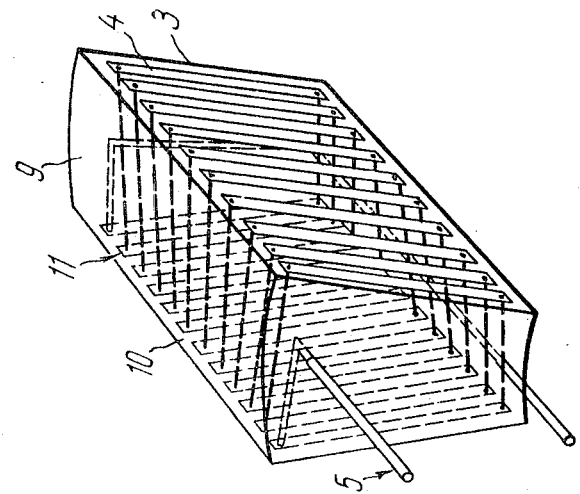
FIG. 2 is a perspective view of a stack in the form of an individual segment arranged on the side walls whereof are printed circuit conductors.

Each of the stacks 3 (FIG. 2) comprises a portion of a toothed section in the form of a tooth 9 and the printed circuit conductors 4 arranged on and mechanically coupled to side-walls 10 of the tooth. When the tooth 9 is made of ferrite possessing high dielectric properties, additional insulation is not required.

The printed circuit conductors 4, 7 can be made by any method commonly used in the manufacture of printed circuit assemblies, for example, an electric one. The end connections of the printed circuit conductors 4 are made, for example, in the form of metallized through passages II. The metallized passages II are arranged on the edges of the side walls 10 of the tooth 9 for the purpose of better utilization of the tooth volume. The terminal pins 5 are placed inside the tooth 9 and let out from the face of the stack 3 opposite to the effective air gap.

The printed circuit conductors 4, interconnected by the metallized passages II and also by the printed circuit conductors 7, form a printed circuit multilayer stator winding.

Figure 4:
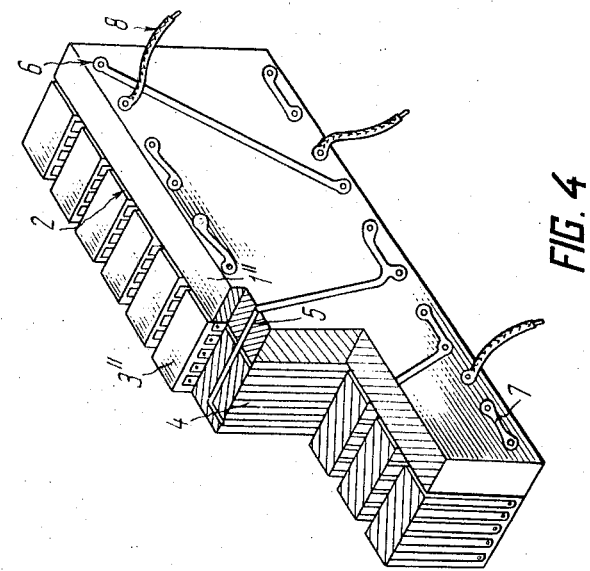
FIG. 4 is a diagrammatic view of a linear type stator having an active zone composed of uniform stacks in the form of parallelepipeds.
Figure 3:
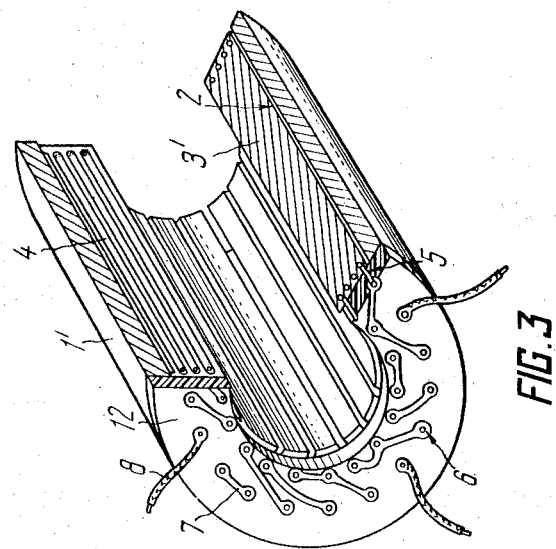
FIG. 3 is a diagrammatic view of a cylindrical type stator having an active zone composed of uniform stacks in the form of segments.

The electric machine stator composed of the uniform stacks 3 can be of an end-face type (FIG. 1), cylindrical or linear type (FIGS. 3 and 4).

A cylindrical type stator (FIG. 3) includes a ferromagnetic carrier 1' in the shape of a cylinder having fastened thereto with an adhesive compound 2 stacks 3' serving as the segments which form the stator active zone.

Terminal pins 5 of the stacks 3' are soldered in metallized passages 6 of an insulating plate 12.

A linear type stator (FIG. 4) includes a ferromagnetic carrier 1'' in the form of a right parallelepiped, fastened thereto with the adhesive compound 2 are stacks 3'' which are right parallelepipeds making up the stator active zone.

Figure 5:
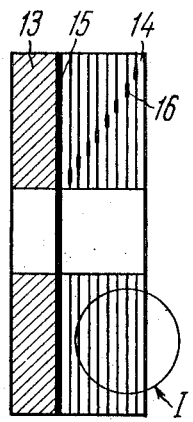
FIG. 5 is a diagrammatic view of an end-face type stator whose active zone is composed of uniform stacks in the form of discs.
Figure 6:
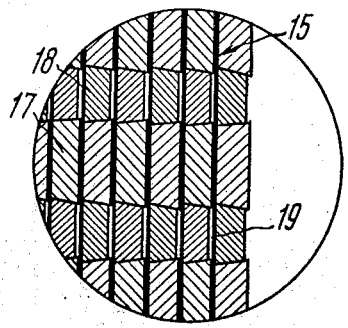
FIG. 6 is an enlarged view of a portion of the stator active zone of FIG. 5.

One of the possible embodiments of the end-type stator (FIGS. 5 and 6) comprises a ferromagnetic carrier 13 shaped as a toroid, a stator active zone composed of disc-shaped stacks 14 interconnected under pressure and fastened to the ferromagnetic carrier 13 with an adhesive compound 15. The terminals of the single-layer windings of individual disc-shaped stacks 14 are interconnected, for example, by soldering (16). Arranged one above another are portions of the toothed sections made of ferrite 17, which form stator core teeth. Printed circuit conductors 18 form a printed circuit multilayer winding with its interlayer air-spacing 19.

Figure 7:
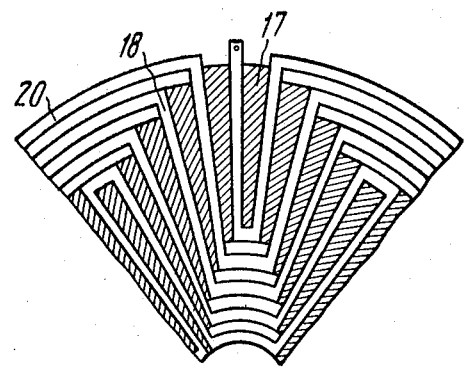
FIG. 7 is a fragmentary diagrammatic view of a stack in the form of a disc, with the interconductor spacings in the active sections of the winding being filled with ferrite.
Figure 8:
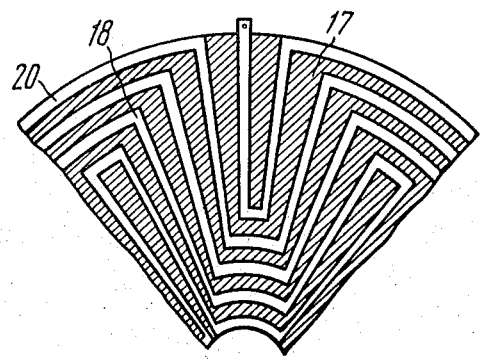
FIG. 8 is a fragmentary diagrammatic view of a stack in the form of a disc, with the interconductor spacings in the peripheral and active sections of the winding being filled with ferrite.

Each stack (FIGS. 7 and 8) of the stator core can be made as a disc with alternately arranged printed circuit conductors 18 and portions of the toothed sections made of ferrite 17. The printed circuit conductors 18 of each stack 14 are interconnected at their peripheral portion 20 and form a single-layer winding. The portions of said toothed sections are formed by filling the spaces between the printed circuit conductors 18 with ferrite. To increase the mechanical strength of a stack (FIG. 8), the spaces between the printed circuit at their peripheral portions 20 may also be filled with ferrite. A solid structure of a stack (FIGS. 7 and 8) is achieved as ferrite, which possesses high adhesive properties, adheres to the side surfaces of the printed circuit conductors 18, 20.

What is claimed is:

1. An electric machine stator comprising: a ferromagnetic carrier of a predetermined shape; a plurality of uniform ferromagnetic teeth affixed to one surface of said ferromagnetic carrier, spaced from one another, and lying in a predetermined pattern; a plurality of printed circuit conductors on first and second opposite surfaces of each of said uniform teeth, said conductors being substantially linear and substantially parallel to one another; a plurality of metallic conductive paths embedded in each of said uniform teeth extending from said first to said second opposite surface, with each conductive path electrically uniting one end of one printed circuit conductor on said first surface to one end of one printed circuit conductor on said second surface, said printed circuit conductors and said metallic conductive paths defining a continuous winding extending from one surface of each of said uniform teeth to an opposite surface thereof; first and second metallic terminals in each of said uniform teeth, connected to respective ends of the continuous winding, and extending out of one surface; connector means through which the respective terminals of each of said teeth extend; and printed circuit conductors on the surface of said connector means opposite from said uniform teeth, for connecting the respective terminals of said uniform teeth in a predetermined electrical pattern.

2. The stator of claim 1, wherein said connector means is said ferromagnetic carrier.

3. The stator of claim 2, wherein said ferromagnetic carrier is toroidal; wherein said uniform teeth lie in a toroidal pattern; and wherein said stator is an end-face type stator.

4. The stator of claim 2, wherein said ferromagnetic carrier is rectangular; wherein said uniform teeth are parallelepipeds; wherein said uniform teeth lie in a linear pattern; and wherein said stator is a linear type stator.

5. The stator of claim 1, wherein said ferromagnetic carrier is in the shape of a cylinder; wherein said uniform teeth lie inside the cylindrical carrier in a cylindrical pattern; wherein said connector means lies at one end of said cylindrical carrier; and wherein said stator is a cylinder type stator.

6. An electric machine stator comprising: a ferromagnetic carrier in the shape of a toroid; a stator active zone comprising a plurality of stacked uniform disc-shaped members affixed to one surface of said ferromagnetic carrier, each of said disc-shaped members comprising a predetermined pattern of ferromagnetic material and printed circuit conductors, with said members being arranged one above the other so that the portions of ferromagnetic material align to define stator core teeth and so that said printed circuit conductors are spaced from one another; and means for interconnecting the printed circuit conductors of adjacent members at the ends thereof.

7. The stator of claim 6, wherein each of said members comprises alternately arranged printed circuit conductors and ferrite sections.

8. The stator of claim 6, wherein the spaces between printed circuit conductors at the peripheral portion of each member are filled with ferrite.

* * * * *